United States Patent Office 3,183,995
Patented May 18, 1965

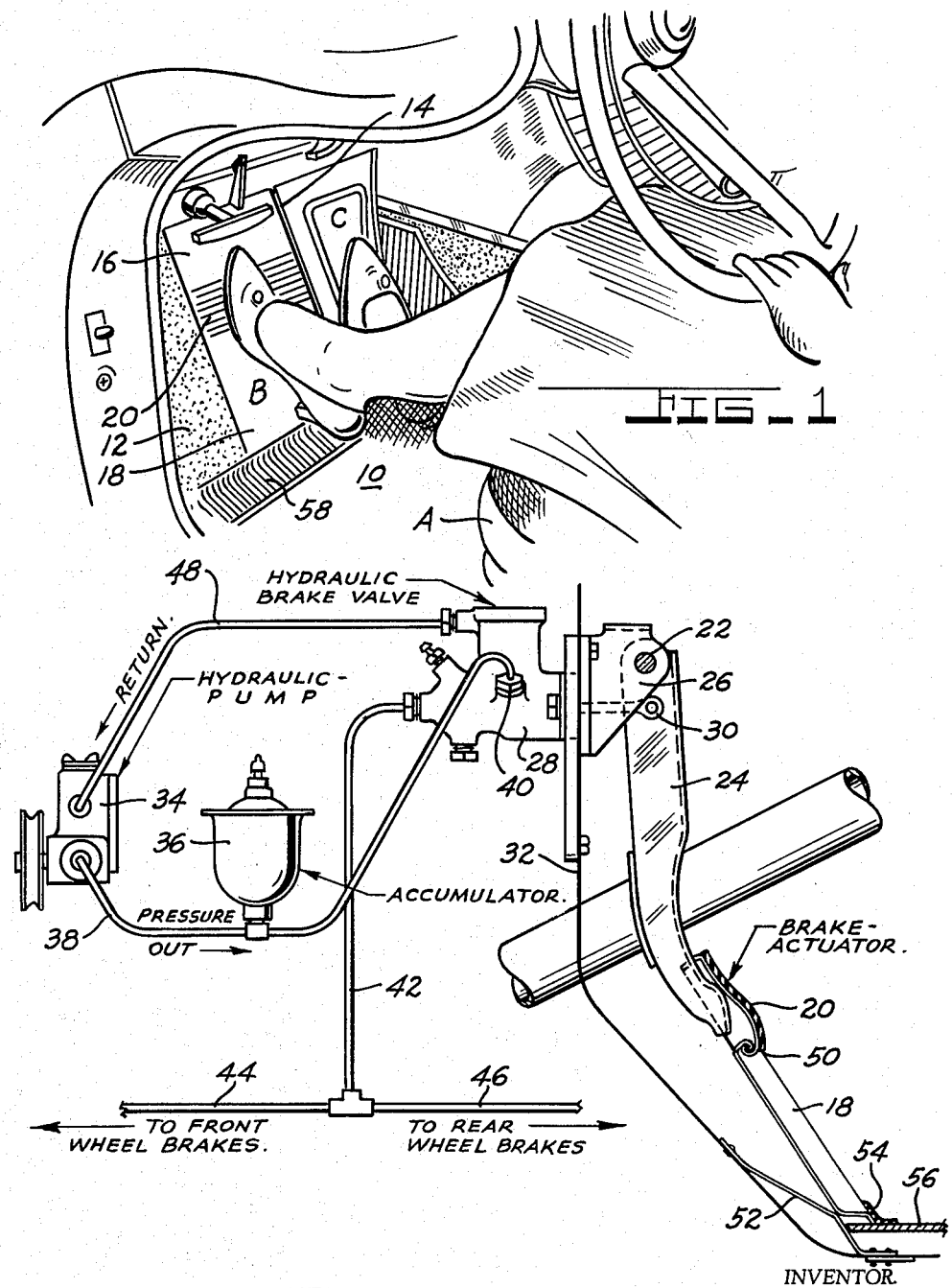

3,183,995
AUTOMOTIVE FLOORBOARD
Harold B. Schultz, South Bend, Ind., assignor to The Bendix Corporation, South Bend, Ind., a corporation of Delaware
Filed July 18, 1963, Ser. No. 295,930
3 Claims. (Cl. 180—90.6)

The present invention relates to a foot control arrangement for an automotive vehicle; and more particularly to a control pedal arrangement which is made part of the floor surface and wherein very little control movement is normally required to operate the vehicle.

This application is analogous to the copending application Serial No. 140,060 filed September 22, 1961 and issued into Patent No. 3,108,651 on October 29, 1963.

An object of the present invention is the provision of a new and improved throttle and brake control arrangement wherein the controls are part of the surface of the floor area and normally require very little foot movement to operate.

Another object of the present invention is the provision of a new and improved control arrangement of the above described type which will permit an operator's foot to accurately adjust and hold various amounts of force on the control portions of the floor surface.

A further object of the present invention is the provision of a new and improved control arrangement of the above described type wherein the brake control normally regulates a power application of the brakes by means of pressure from the operator's foot, rather than movement of the operator's foot; and wherein the brakes can be operated manually by a subsequent movement of the control beneath the surface of the floor area.

A more particular object of the present invention is the provision of a new and improved control arrangement of the above described type wherein the transition from normal pressure responsive type of control to the position responsive type of control can be made during a surprise power failure in accordance with the natural reactions and foot movements of an operator.

The invention resides in certain constructions and combinations and arrangements of parts; and further objects and advantages of the invention will become apparent to those skilled in the art to which it relates from the following description of several embodiments described with reference to the accompanying drawings forming a part of this specification, and in which:

FIGURE 1 of the drawings is a perspective view of the driver's compartment of an automotive vehicle showing a floor and foot control arrangement constructed in accordance with the principles of the present invention; and FIGURE 2 is a somewhat schematic view of a hydraulic braking system operated by means of a brake control utilizing a floorboard portion as shown in FIGURE 1.

Conventional power brake systems which are manufactured in the United States today employ several motor units in which the brake pedal moves in accordance with the motion of the fluid displacing master cylinder to provide what is known as "follow-up," and thereby apprise the operator of the amount of brake actuation which is being produced. The commercial units being built today further include a feature known as "reaction," wherein a reaction force is delivered to the foot of the operator which is directly porportional to the force being delivered to the vehicle's brakes. Conventional braking systems therefore use both movement and opposing force to apprise the operator of the amount of braking effort which is being produced. Conventional power braking systems further include an arrangement whereby the brakes can be actuated by manually applied force during power failure of the servomotor. This is conventionally done with the same control lever used to control the power application of the brakes; and for this reason, it has been necessary heretofore to allow a considerable amount of brake pedal movement in the systems.

Several prior art workers have proposed to operate the brakes of an automotive vehicle with a brake control arrangement that provides "reaction" only as a means of apprising the operator of the amount of braking effort being produced. One of the difficulties found with a system is that it is difficult to accurately adjust the amount of force being applied to the control pedal, particularly where conventional foot pedal lever arrangements have been used. It will readily be apparent that with any control arrangement which does not permit an accurate adjustment of force upon the control, a grabbing of the brakes which throws the weight of an operator forwardly upon the brake control further aggravates the situation.

According to principles of the present invention, applicant has found that large amounts of force can best be applied to the brake control with a lower calf and ankle held taut and the force applied with the thigh muscles. It has further been found that where the thigh muscles are used to apply the force, that it is difficult to accurately gauge the amount of force which is being applied; therefore, where these muscles are used, position response must be depended upon to apprise the operator of the amount of actuation being produced by the braking system. It has further been found that variations in small amounts of applying force can best be regulated by use of the calf muscles with the ankle joint firmly supported in some manner to produce a slight rocking action about the ankle joint. In order that decelerations of the vehicle will not alter the amount of force being applied by the operator's foot, it has been found that the heel of the operator's foot should be anchored against some form of abutment.

According to further principles of the present invention, it has been found that force should be transmitted from the foot to the brake control surface by means of the ball of the foot, in such a manner that the distance between the ankle joint and the point of bearing on the brake control surface does not vary appreciably with ankle movement.

According to still further principles of the present invention, it has been found that in a transition from the above described pressure control to one where large amounts of physical effort are applied to the brake control surface it is best accomplished by an arrangement wherein the ankle joint is flexed; so that the ball of the foot is more in line with the calf bone, and the ball of the foot is thereafter pressed forwardly by means of thigh muscles.

According to these principles, therefore, the preferred brake control arrangement will normally provide an anchor for the heel, so that minor variations in force can be transmitted by the ball of the operator's foot; and will further provide an arrangement which naturally accommodates raising of the heel from the anchor by a rocking action about the ball of the foot and is thereafter actuated by a forward thrust produced by the thigh muscles of the leg of the operator. While such an arrangement may be provided by means of levers positioned above the general floor of the vehicle, further advantages will be obtained by making the foot pads of the levers as part of the floor area.

The driver's compartment shown in FIGURE 1 generally comprises an operator's seat A which is positioned generally above a floor having a horizontal area 10 and a forward portion 12 which is inclined upwardly from the horizontal area at an angle at approximately 60°. The angle at which the forward portion or area is inclined above the horizontal area will depend upon the height of the seat above the floor, as well as its position rearwardly of the inclined area; so that its angle corresponds to the normal position of an operator's foot when his heel rests upon the inclined portion and his ankle joint is bent slightly forwardly at a comfortable angle. The surface of the inclined area 12 further includes a generally parallel section forming the brake pedal arrangement B and the throttle pedal arrangement C which are parallelly spaced on each side of an opening 14 in the inclined floor area 12.

Brake pedal arrangement B comprises an upper brake actuating pedal 16 which is used to apply force to the brake operating structure; and a lower "follow-up" portion 18 which is used to accommodate inward movement of the foot, as will later be explained. The upper brake actuating pedal is provided with a raised pad portion 20 having a generally cylindrical surface which extends across the lower end of the brake pedal 16; so that the ball of the operator's foot will roll thereagainst inward movement of the pedal 16. The pedal 16 is hinged or pivoted, as at 22, at a position spaced considerably above the pad portion 20; so that the pad portion does not move downwardly, such as would occur if the pedal 16 were hinged below the pad, but instead will move generally in a horizontal plane with a slight amount of upward motion as naturally occurs during flexing of the knee joint. This causes the heel of the operator to be lifted slightly during a depressing of the pedal 16, for reasons which will be later explained. The pedal 16 may be made in any suitable manner, and as shown in the drawings is constructed by means of two bracket portions 24, respective ones of which are positioned adjacent opposite sides of the pad portion 20 and extend upwardly to the pivot 22 that is suitably supported by means of a bracket 26 beneath the instrument panel. Motion of the brackets 24 is transmitted to a brake control valve 28, of the type shown and described in the copending application No. 226,614, filed September 27, 1962 and assigned to the common assignee, by means of a push rod 30. The brake control valve is mounted on the firewall 32 of the vehicle, and is part of the hydraulic brake actuating system.

The brake actuating system shown in FIGURE 2 comprises a belt-driven hydraulic pump 34 which delivers pressure to an accumulator 36 through the pressure line 38— which line also communicates with the pressure inlet 40 of the brake control valve 28. The pressing of the pedal 16 causes a modulated pressure to be delivered to the hydraulic output line 42 having branches 44 and 46 leading to the front and rear wheel brakes (not shown) respectively. It will be understood that the front and rear wheel brakes will be of the conventional type having hydraulically actuated pistons which force friction elements, such as shoes, into engagement with rotating structures, such as drums, to provide a retrading torque for the wheels of the vehicle. Upon a release of the pedal 16 the brake control valve 28 exhausts pressure from the hydraulic output line 42 to the exhaust line 48 leading to the suction of the hydraulic pump 34. Suitable means are provided in the pump 34 for "unloading" the pump structure when a predetermined pressure is reached in the line 38; and a check valve is also provided for maintaining this pressure in the line 38.

The brake control valve 28 is of a type which will modulate pressure in the output line 42, when hydraulic pressure is available with a minimum amount of valve actuating movement. Under normal conditions, therefore, the pad 20 of the brake lever 16 will only move approximately one-eighth of an inch. During this movement, a reaction force is delivered to the push rod 30 which is directly proportional to the output pressure in the line 42 leading to the front and rear brake structures. The brake control valve 28 is designed to normally actuate the brakes with only a moderate amount of pressure upon the pad 20, which in the preferred embodiment is approximately 50 pounds. The brake control valve 28 is further designed so that upon a hydraulic pump failure, the push rod 30 can be moved inwardly to physically actuate a displacement piston which in turn displaces fluid out into the output 42 to actuate the brakes. During this inward movement of the push rod 30, the brake pedal 16 will move from its normal control position shown in the drawings in an interposition.

To accommodate the interposition of the brake pedal 16 I have hinged the lower "trap door" portion 18 as at 50 to the lowermost extremity of the pad portion 20 of the brake pedal 16. In addition, the lower extremity of the "trap door" 18 rests in the normal position, as seen in FIGURE 2, against a ramp 52 immediately underlying the inclined portion 18. Thus as the pedal 20 is depressed during normal power operation the lower portion 18 will move very slightly up the ramp 52. However, when a no-power condition is experienced the lower portion 18 will move along ramp 52 such that it will in no way hinder the travel needed to manually operate the brake valve 28.

If it is evident that a metal to metal contact may be brought about by the rising of the lower portion on ramp 52, a nylon strip may be suitably affixed to the lower extremity of the lower portion 18 to obviate any noise that may arise during operation of the brakes. In addition, and once again, if it is found to be necessary, one may employ a spring between the upper portion 16 and the lower portion 18 to bring about a smooth uninterrupted outward appearance within the vehicle. Furthermore, a rubber strip 54 is shown attached to the lower portion 18 to provide a seal with respect to a floormat 56 of the vehicle during normal power actuation of the system.

It has been proposed by prior act devices to provide a stationary ledge between the brake control B and the throttle control C in order that one may not operate both at the same time, however, I have found that such a ledge may also hinder the operation of one or the other controls in that it is rather easy to place the foot upon the ledge. Therefore, I have arranged the controls in such a fashion that they are spaced by an opening, thus allowing one to operate the brakes and/or the throttle regardless of placing the foot thereover.

Although the manner in which the throttle pedal C is constructed and operated is not a necessary part of the present invention, particular advantages occur when the throttle C is hinged about an axis which is coextensive with the resting point of the lower portion 18 on the ramp 52. I have also found that for restful driving it is also advisable to provide a ledge portion 58 (see FIGURE 1) against which the heel of the operator may bear. The throttle control is intended to be a position responsive device.

While the invention has been described in considerable detail, I do not wish to be limited to the particular construction shown and described and it is my intention to cover hereby all novel adaptations, modifications, and arrangements thereof which come within the practice of those skilled in the art to which the invention relates.

I claim:

1. In controls for a vehicle, a floorboard having adjacent and horizontal and inclined areas including:
    a portion extending across said inclined area and spaced a predetermined distance away from said horizontal area, which portion is adapted to receive an operator's foot such that the heel of the foot rests adjacent the horizontal area, an upwardly extending section adapted to form with said portion the inclined area, which section is operatively connected to said horizontal area such that said portion and said section swing inwardly as pressure is applied thereto by the operator's foot, a control mechanism, and a means connecting said portion with said control mechanism, said upwardly extending section having a hinge adjacent to the lower extremity thereof to which the lower portion is hingedly mounted.

2. In controls for a vehicle: a floorboard having adjacent, horizontal and inclined areas, said inclined area having an upwardly extending section which includes a raised portion spaced from said horizontal area and normally contacted by the ball of the operator's foot and which raised portion is adapted to be depressed beneath the level of said inclined area, said upwardly extending section forming a control with said raised portion a distance away from said horizontal area being hinged above said upwardly extending section for movement below the surface of said inclined area, and said upwardly extending section forming said control, also including a movable section below said raised portion and hingedly connected to said raised portion against the adjacently lowered extremity of said raised portion, said movable section allowing inward movement of said operator's foot during depressing of said control without appreciable resistance.

3. In controls for a vehicle: a floorboard having adjacent horizontal and inclined areas, said inclined area having generally parallel sections thereof each of which includes a portion spaced from said horizontal area which portion is normally contacted by the ball of the operator's foot and which parallel section form an accelerator control and a brake control which controls are adapted to be depressed beneath the level of said inclined area, said inclined area including an open portion between said controls, said parallel section forming said brake control having a hinged upper portion with a raised pad portion extending across said section at said predetermined distance away from said horizontal area and being hinged above said parallel section for movement below the surface of said inclined area, and said parallel section forming said brake control also including a movable section below said pad and hingedly connected to the lower extremity of said pad which movable section accommodates inward movement of said operator's foot during depressing of said upwardly extending brake control.

References Cited by the Examiner

UNITED STATES PATENTS

| | | |
|---|---|---|
| 2,912,081 | 11/59 | Strauss. |
| 2,983,347 | 5/61 | Risk. |
| 3,108,651 | 10/63 | Miller _____ 180—90.6 |

FOREIGN PATENTS

| | | |
|---|---|---|
| 284,331 | 5/28 | Great Britain. |
| 360,367 | 2/06 | France. |

A. HARRY LEVY, *Primary Examiner.*

PHILIP ARNOLD, *Examiner.*